E. F. W. ALEXANDERSON.
BEARING.
APPLICATION FILED DEC. 7, 1912.
1,110,030.
Patented Sept. 8, 1914.
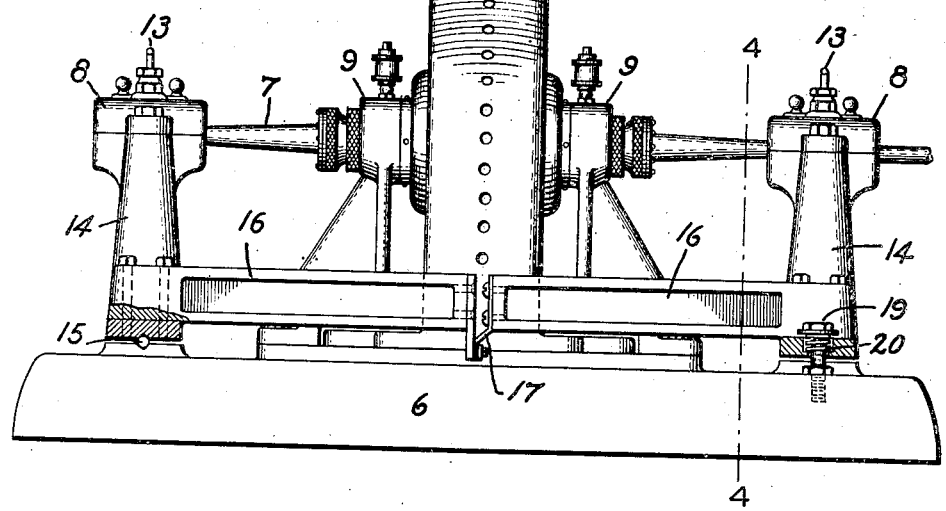
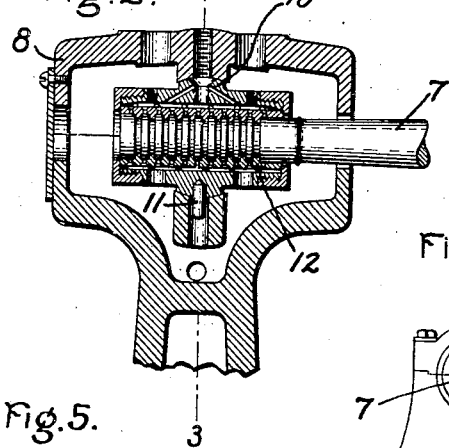
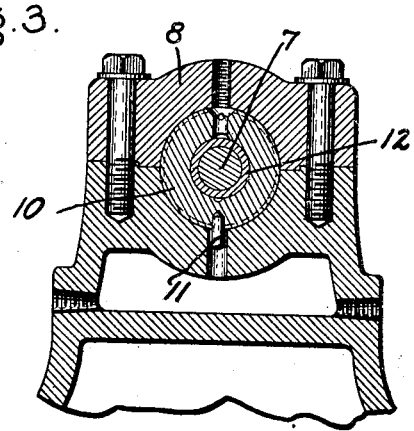
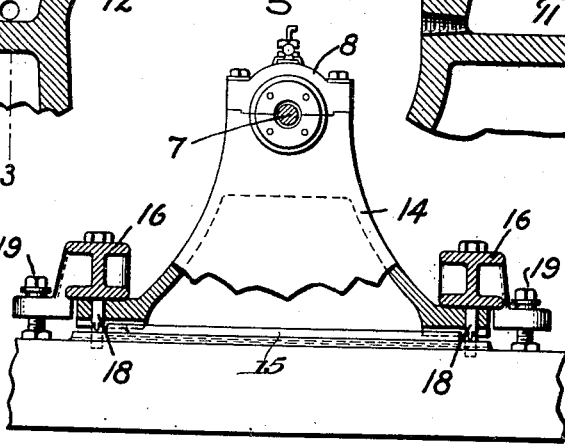
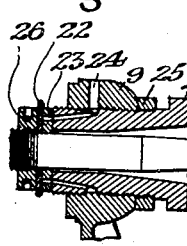
Witnesses.
Earl G. Klock.
J. Ellis Glen
Inventor:
Ernst F. W. Alexanderson,
by Albert G. Davis
His Attorney.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

BEARING.

1,110,030. Specification of Letters Patent. Patented Sept. 8, 1914.

Original application filed October 19, 1911, Serial No. 655,480. Divided and this application filed December 7, 1912. Serial No. 735,358.

*To all whom it may concern:*

Be it known that I, ERNST F. W. ALEXANDERSON, a citizen of the United States, residing at Schenectady, county of Schenectady, State of New York, have invented certain new and useful Improvements in Bearings, of which the following is a specification.

My invention relates to bearings, and is particularly applicable to bearings in machines of the type disclosed in Patent, No. 1,008,577, issued to me.

My present application is a division of my application for high frequency alternators Serial No. 655,480, filed October 19, 1911.

The present invention consists in a novel construction of yielding bearing, which will be best understood by reference to the accompanying drawings, in which:—

Figure 1 is a side elevation of a machine embodying the novel features of my present invention; Fig. 2 is a detail view in cross section showing the self alining construction of the bearings; Fig. 3 is a sectional view taken on line 3—3 of Fig. 2; Fig. 4 is a sectional view taken on line 4—4 of Fig. 1, and Fig. 5 is a detail view in cross section illustrating the construction of the inner bearings.

The machine illustrated in the drawings is an alternator of the general construction described in my prior patent, and comprises a stator 5 supported by a base 6. The rotor of the alternator is carried at the center of a long flexible shaft 7, as shown in Fig. 1. The purpose of such a shaft is to allow the rotor or inductor, when up to speed, to revolve about its own center of gravity. The main bearings 8 are at a distance from the rotor or center of the shaft so as to permit the shaft to bend and the rotor to center itself on its own center of gravity when up to speed. Other bearings 9 are placed near the rotor or center of the shaft. These bearings are normally out of engagement with the shaft, but are engaged by the shaft when the rotor vibrates when passing its critical speed in coming up to speed. At this time these bearings 9 serve to prevent such excessive vibration as might bring the periphery of the rotor into engagement with the stator.

The construction of the bearings 9 will be understood by reference to Fig. 5 of the drawings. Each bearing 9 has screw threaded into it a member 21, which surrounds the shaft 7 so loosely that during normal running it is not engaged by the shaft, but, during the vibration that occurs while the rotor is being brought up to speed and is passing its critical speed, the member 21 is engaged by the shaft 7 and serves to limit the vibration of the rotor. At the same time the member 21 serves as an end-thrust bearing for the rotor. A washer 22 is fast to the shaft 7 and rotates with the shaft and lock nuts 26, the latter being screw-threaded on the shaft and serving to prevent axial displacement of the rotor on the shaft. A stationary member 23 has a bearing engagement with the washer 22. Oil is supplied to the bearing surfaces through holes 24. The member 21 is screw-threaded into the bearing 9 in order to permit its axial adjustment and the proper division of end-thrust between the bearings. A lock nut 25 is provided for securing the member 21 in position.

In order to obtain good efficiency in a machine of this character, the air gaps should be small, and since the air gaps of the machine lie in radial planes, it is necessary to prevent axial displacement of the rotor in running. The arrangement of bearings described above, if the bearings are constructed as shown and explained in detail in my prior patent and as illustrated in Fig. 2 of this application, serve to maintain the rotor in its proper position midway between the faces of the stator, and thus the air gaps may be made small.

The member 10 of each bearing 8 is of the usual self alining construction provided with the usual pin 11. The rotatable shaft 7, where it passes through the bearing, is grooved as shown, and between it and the member 10 is a cylindrical member 12. The member 12 is grooved on its inner side to fit the grooves in the shaft 7, so that it both supports the weight of the shaft and is adapted to receive an end thrust on the shaft, and at the same time, while rigid with member 10, moves with that member in its self alining action to permit the bending of the shaft when the machine is up to speed. The member 12 is slotted and pierced with holes to receive oil which may be supplied to the bearings 8 by pipes 13. As is clearly shown in Fig. 2, the oil is fed freely to the entire contact surface between the shaft 7 and the member 12. It will thus be seen that both bearings on each side of the rotor are designed to receive an end thrust of the shaft, and if in operation the rotor gets slightly out of center, there is produced magnetically, because one air gap is then smaller than the other, a pull tending to move the rotor axially farther from its midway position. This results in increased pressure on the two thrust bearings on one side of the rotor and consequently a greater generation of heat in these bearings. This increased heat produces a relative expansion of the length of the shaft between the two bearings on that side of the rotor, and this expansion serves to restore the inductor to its midway position. The centering is thus entirely automatic.

My present invention comprises a novel feature in regard to the support for the outer bearings 8. It will be clearly seen that the construction of the bearings 8 is such that these bearings normally tend to limit a longitudinal movement of the shaft. In order to prevent any possibility of binding upon a longitudinal expansion of the shaft, throughout its length, caused for example, by a temperature rise, I pivotally support the bearings 8 so that they yield under the force of longitudinal expansion of the shaft. To give the bearings this yielding support their pillow blocks 14 are mounted pivotally on roller bearings so that the tops of the pillow blocks where the shaft bearing-members are carried can move a small amount in the direction of the axis of the shaft. The roller bearing for each pillow block consists of a cylindrical rod 15 which engages a V-shaped groove in the base 6 and a similar groove in the base of the pillow block, as will be readily seen by reference to Figs. 1 and 4 of the drawings. Each pillow block is thus mounted for angular movement about its coöperating rod 15 as a pivot. In order to insure that both bearings 8 shall move equally so as to maintain the rotor central, the pillow blocks are connected by beams 16 and a flat spring 17. This spring yields to permit the upward or downward movement of the adjacent inner ends of the beams 16 as the bearings move under the expansion or contraction of the shaft, but prevents movement of either beam unless the other beam moves equally, thus an equal and corresponding movement of both bearings 8 is insured. In this manner a thrust upon one bearing is transmitted through the beams and connecting spring to produce a corresponding and equal thrust on the other bearing. The movement of the bearings 8 is at most only a small fraction of an inch and with the self alining construction of bearings this movement does not affect the true alinement of the shaft and bearings or cause the shaft to bind in the bearings.

The movement of the pillow blocks in any direction except that of the axis of the shaft, is prevented by dowel pins 18 which are jointed as indicated in Fig. 4 to permit the axial movement of the bearings, but which prevent movement in any other direction. Bolts 19, which are screwed into a bed plate and which press against the pillow blocks, or rather against the beams 16 secured to the pillow blocks, through compression springs 20, hold the pillow blocks firmly pressed on the roller bearings 15, but permit the desired slight movement of the pillow blocks on these bearings.

The operation of the bearings 8 and coöperatively related elements will be understood from the foregoing description and following explanation. Each bearing can turn through a slight angle due to the pivotal mounting of the pillow blocks 14, the pillow blocks turning about the rods 15 as pivots. Assuming that the right hand bearing 8 receives a thrust from the shaft 7, its supporting pillow block will turn through a small angle about the coöperating rod 15 as a pivot. The right hand beam 16 will turn with the pillow block and the inner end of the beam will move upwardly a certain amount. The inner ends of the beams 16 are flexibly secured together by means of the spring 17, and thus when the right hand beam moves the left hand beam must correspondingly move. Since the beams are rigidly secured to the adjacent pillow blocks, a beam cannot move without moving its pillow block. Thus when the inner end of the left hand beam is slightly raised by the right hand beam, the left hand pillow block is slightly turned about its pivot. The resultant of these different movements is that the two pillow blocks and hence the two bearings 8 are moved about their pivots in opposite directions an equal amount.

While I have described my invention, with reference to dynamo electric machines, it is obvious that the invention is in no sense limited to such machines, but is adapted to be employed in machines of any character where the bearings normally tend to limit longitudinal movement of the shaft. It will also be understood that my invention is not limited to a longitudinal expansion of the shaft due to temperature rise, since I have merely used this particular illustration to describe the principle of my invention. As I do not desire to limit myself to the particular construction and arrangement of parts here shown and described, I aim in the appended claims to cover all modifications which are within the scope of my invention.

What I claim as new and desire to secure by Letters Patent of the United States, is:—

1. In combination a rotatable shaft operatively mounted between two supporting bearings, a rotor member secured to said shaft between said bearings, each of said bearings tending normally to limit longitudinal movement of the shaft but being mounted to yield under a longitudinal expansion of the shaft, and means whereby upon the longitudinal expansion of the shaft a thrust on one bearing is transmitted to produce a corresponding thrust on the other bearing.

2. In combination a rotatable shaft operatively mounted between two supporting bearings, a rotor member secured to said shaft between said bearings, a pivotally mounted pillow block for each bearing whereby the bearing can be moved through a small angle, a beam rigidly secured to each pillow block, and means for yieldingly connecting said beams to each other.

3. In combination a rotatable shaft operatively mounted between two supporting bearings, a movably mounted pillow block for each bearing, a beam secured to each pillow block, said beams extending from the pillow blocks toward each other, and means for yieldingly connecting the adjacent ends of said beams.

4. In combination a rotatable shaft operatively mounted between two supporting bearings, each of said bearings tending normally to limit longitudinal movement of the shaft, means for mounting said bearings so as to permit a longitudinal expansion of the shaft, beams secured to each bearing and extending toward each other, and means for yieldingly connecting the adjacent ends of said beams.

5. In combination a rotatable shaft operatively mounted between two supporting bearings, a rotor member secured to said shaft between said bearings, each bearing comprising a pillow block and a self-alining bearing member operatively carried thereby, means for pivotally mounting each pillow block whereby it yields under a longitudinal thrust of the shaft, and means whereby a movement of one pillow block is transmitted to produce a corresponding movement of the other pillow block.

6. In combination a rotatable shaft operatively mounted between two supporting bearings, each bearing comprising a pillow block and a self-alining bearing member operatively carried thereby, means for pivotally mounting each pillow block whereby it yields under a longitudinal thrust of the shaft, beams secured to each pillow block and extending toward each other, and means yieldingly connecting the adjacent ends of said beams.

7. In combination a rotatable shaft operatively mounted between two thrust bearings, means in addition to said bearings for limiting longitudinal movement of the shaft, each of said bearings being mounted to yield under a longitudinal thrust of the shaft, and means whereby a longitudinal thrust on one bearing is transmitted to produce a corresponding thrust on the other bearing.

8. In combination a rotatable shaft operatively mounted between two thrust bearings, means in addition to said bearings for limiting longitudinal movement of the shaft, a pillow block for each bearing mounted to yield under a longitudinal thrust of the shaft, beams secured to each pillow block and extending toward each other, and means yieldingly connecting the adjacent ends of said beams.

9. The combination with a rotatable shaft of bearings for said shaft, said bearings comprising a movably mounted pillow block and a self alining bearing-member, beams secured to each pillow block and extending toward each other, and a leaf spring connecting the adjacent ends of said beams.

10. The combination with a long flexible rotatable shaft of four bearings, two on each side of the center of said shaft, one bearing on each side of the center of said shaft being comparatively close to the center and the other at a distance therefrom, the two outer bearings on opposite sides of the center being yieldingly mounted to permit longitudinal expansion of the shaft, and connecting means between said last mentioned bearings for insuring equal movement of such bearings upon the longitudinal expansion of the shaft.

11. The combination with a long flexible rotatable shaft of four bearings, two on each side of the center of said shaft, one bearing on each side of the center of said shaft being comparatively close to the center and the other at a distance therefrom, each of the two outer bearings on opposite sides of the center comprising a movably mounted pillow block and a self alining bearing-member, beams secured to each pillow block of the last mentioned bearings and extending toward each other, and means for yieldingly connecting the adjacent ends of said beams.

In witness whereof I hereunto set my hand this 5th day of December, 1912.

ERNST F. W. ALEXANDERSON.

Witnesses:
BENJAMIN B. HULL,
HELEN ORFORD.